United States Patent [19]

Smith et al.

[11] 4,010,893

[45] Mar. 8, 1977

[54] TRIAC CENTRIFUGE

[75] Inventors: John A. Smith, East Orange; Jack H. Miller, Morristown; Russell C. Schilling, Denville; Howard L. North, Jr., Newfoundland, all of N.J.

[73] Assignee: Becton, Dickinson and Company, East Rutherford, N.J.

[22] Filed: June 20, 1975

[21] Appl. No.: 588,713

[52] U.S. Cl. .................................... 233/24; 233/26

[51] Int. Cl.[2] ...................... B04B 9/10; B04B 5/02; B04B 7/06

[58] Field of Search ............... 233/1 B, 1 R, 26, 27, 233/23 R, 11, 24; 356/246

[56] References Cited

UNITED STATES PATENTS

| | | | |
|---|---|---|---|
| 2,699,289 | 1/1955 | Allen et al. | 233/26 |
| 2,783,938 | 3/1957 | Grela et al. | 233/26 |
| 3,148,146 | 9/1964 | Asnes et al. | 233/26 X |
| 3,454,217 | 7/1969 | Harbott | 233/26 |
| 3,674,198 | 7/1972 | Eberle | 233/26 |
| 3,720,368 | 3/1973 | Allen | 233/26 |
| 3,750,941 | 8/1973 | Drucker | 233/26 |

*Primary Examiner*—George H. Krizmanich
*Attorney, Agent, or Firm*—Kane, Dalsimer, Kane, Sullivan and Kurucz

[57] ABSTRACT

A centrifuge for varied speed operation. The centrifuge includes a stator portion forming a chamber therein and adapted to be positioned on a supporting surface. A rotor portion is rotatably mounted in the chamber of the stator. A drive motor on the stator rotates the rotor at the desired speeds. Sample holders are on the rotor to hold a number of different type of samples. A cover is on the stator and is adapted to be shifted between the open and closed positions. Electrical controls are connected to the drive motor to vary the speed of the rotor to correspond with the speed required for centrifuging the samples being held which may be blood, urine or hematocrit samples and for starting and stopping the centrifuge.

8 Claims, 8 Drawing Figures

TRIAC CENTRIFUGE

BACKGROUND OF THE INVENTION

It is well known in centrifuge operations that there are many different types of laboratory tests to be conducted which require different speeds of centrifugation for obtaining the desired results. For example, different types of blood sampling and testing including the procedure required for hematocrit testing and urine testing require different speeds of centrifugation. This becomes a problem and is cumbersome where the centrifuge being used is not adapted for a variation of operational speeds. Often different centrifuges are required for different types of tests.

Additionally, many centrifuges presently being used are designed for a particular test and accordingly have different holding means on the rotor mechanisms to hold a particular type of sample tube which is dependent upon the nature of the material being tested and the type of test being carried out. This is of particular interest where different size tubes are employed for different types of tests such as the size of tubes being utilized for urine and blood tests in general in contrast to the type and size of tubes being utilized for hematocrit testing. Consequently, it is often necessary to employ different centrifuges because of the need for different types of holding means to accommodate the sample containers for the individual test.

It should also be kept in mind that ventilation and noise is of interest when dealing with centrifuging particularly at high speeds. Appropriate ventilation means is always desirable and an insulated structure is also always desirable to keep the apparatus as cool and as noiseless as possible.

Furthermore, it is also of extreme value in a centrifuge apparatus if the appropriate safety measures are present so that the danger of injury to the operator or damage to the samples which might invalidate the test is small. Accordingly, safety structure is desirable so the motor of the centrifuge cannot be started until the cover has been closed to seal the operating chamber. Furthermore, it will be brought to a rapid stop if the cover is opened while the unit is operating.

Cost is naturally also of great concern in centrifuge designs and structures which can carry out a multiplicity of different types of test functions are extremely desirable. Additionally, it is also desirable when the structure employed to handle the samples during the testing procedure can be constructed of low cost materials in a quick and efficient manner so as to reduce the overall cost of the ultimate centifuge.

SUMMARY OF THE INVENTION

With the above background in mind, it is among the primary objectives of the present invention to provide a low cost centrifuge which is adapted for use at a multiple of operational speeds for use in different operational modes. It is adapted for example to be used in a variety of different blood tests including hematocrit tests and for use in urine testing procedures. The single machine includes structure and controls for holding and centrifuging a variety of samples as discussed above. Furthermore, appropriate means are employed on the centrifuge to reduce vibration and noise level and to ventilate and cool the apparatus during operation. Additionally, appropriate sealing structure is present to properly seal the lid tightly into engagement with the remainder of the centrifuge while the samples are being processed therein. Furthermore, the present invention is designed for a latched cover with an appropriate safety switch so that the centrifuge cannot be started until the cover has been closed and latched.

The rotor head is constructed of low cost materials which are simple to manufacture and which are designed to accommodate sample tubes for a variety of different tests such as hematocrit tests, urine tests and other blood tests employing larger tubes of blood than required for hematocrit testing procedures. It should be pointed out that the head is designed so that the hematocrit readings can be taken directly off the indicia on the head after the centrifuging operation has been completed. In this manner, the rotating head of the centrifuge is designed for self-reading. A unique trunnion assembly is employed to hold the larger sample tubes with the assembly initially being formed in a simple manner in two parts and quickly and efficiently assembled to form an inexpensive final product trunnion assembly.

Shiftable structure is also provided on the inexpensively formed rotor head which enables the head to be used at a variety of speeds up to 10,000 rpm, for example, without detracting from efficiency of operation. Additionally, the structure is designed to accommodate handling of air flow for cooling in operational purposes during the use of the centrifuge at the variety of speeds and in the variety of operational modes.

To summarize in general, the centrifuge includes a stator portion forming a chamber therein and being adapted to be positioned on a supporting surface. A rotor portion is rotatably mounted in the chamber of the stator. Variable drive means is on the stator and connected to the rotor to rotate the rotor at desired speeds. Sample holding means is on the rotor and is adapted to hold a number of different types of sample holders. A cover is on the stator and is adapted to be shifted between the open and closed position. Finally, control means is connected to the drive means to vary the speed of the rotor to correspond with the speed required for centrifuging the samples being held by the sample holding means and for starting and stopping the centrifuge.

With the above objectives, among others, in mind, reference is had to the attached drawings.

DESCRIPTION OF THE PREFERRED EMBODIMENT

Figure 1:
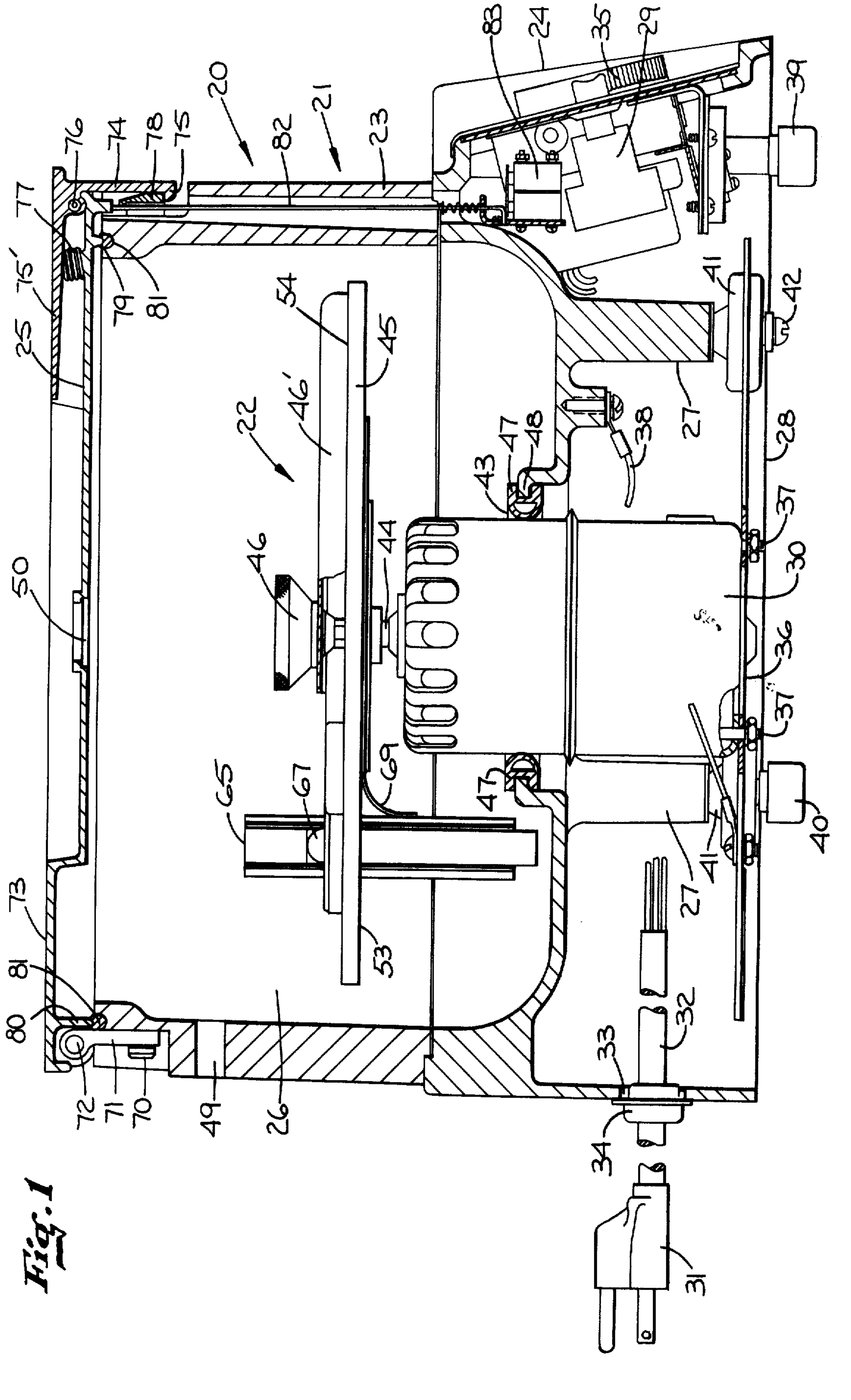
FIG. 1 is a sectional elevation view of the centrifuge of the invention.

Centrifuge 20 as depicted in FIG. 1 includes a stator portion 21 and a rotor portion 22. The stator includes an interconnected top half 23 and a bottom half 24. A pivoted cover 25 is mounted to the top half 23.

The interior of the stator 21 is hollow so as to form an interior chamber 26.

Bottom half 24 is bowl-shaped in configuration with three legs 27 extending downwardly. A peripheral skirt 28 extends downwardly on lower portion 24 of stator 21 and encompass legs 27 therein. Also housed within shirt 28 is the electrical control center 29 and the drive motor 30.

A suitable plug 31 extends from the exterior of lower portion 24 for connection to an outlet. The electrical conduit 32 extending from plug 31 passes through an aperture 33 in skirt 28 at which point it is housed within collar 34. The conduit 32 extends into communication with the electrical control box 29 in conventional fashion (not shown). In this manner, power is supplied to electrical control center 29 which has suitable control knobs 35 on the exterior surface thereof for operation of the machine.

Drive motor 30 is mounted on plate 36 on the interior of skirt 28 in an appropriate fashion such as by bolts and nuts 37 as shown. Suitable ground wires 38 connect to the body of stator 21 and plate 36.

Two feet 39 extend downwardly from skirt 28 for resting on a supporting surface. The feet 39 are resilient in nature to minimize vibration noise and movement of the centrifuge during operation. Two similar feet 40 extend downwardly from legs 27 to balance the centrifuge 20 on the supporting surface. Also secured to legs 27 are resilient bases 41 which support plate 36 by a conventional means such as screws 42. The resilient bases 41 provide a further isolation of internal parts of the centrifuge against rotor vibration.

Motor 30 extends upward through an opening 43 in the lower portion 24 of stator 21 and has a central shaft 44 extending upwardly into chamber 26 on which is mounted the rotor 45. Keyway 45' in the center of the rotor mates with the shaft configuration of shaft 44 so that the rotor rotates with the shaft. A removable locking knob 46 is centrally located and is affixed to shaft 44 to hold the rotor cover 46' in position. Rotation of the shaft 44 of drive motor 30 causes rotation of rotor 45 during operation of the centrifuge. A resilient circular bumper 47 is located and mounted on an annular rib 48 of stator 21 at the point where motor 30 passes through aperture 43. The bumper 47 engages with the shoulder 48 and with the outer surface of the motor to dampen vibrations and to seal the motor to the lower portion 24 of stator 21.

Ventilation and cooling of the interior of the centrifuge is facilitated by means of apertures 49 passing through the top half 23 of stator 21 and aperture 50 through the cover 25 and by air drawn through the bottom of the centrifuge and through the motor into chamber 26. Bumper 47 facilitates the air being passed from the bottom of the centrifuge through the motor for cooling purposes by forming a seal between the motor and the walls forming opening 43. Where appropriate, further apertures can be provided so that the rotational operation of the rotor is accompanied by circulation of air through the chamber 26 and the remainder of the centrifuge for ventilation and cooling purposes.

Rotor 45 is in the general shape of a circular disc and contains eight sample stations about its periphery. Every other station 51 is designed for hematocrit determinations and are adjoined by carriage stations for handling tubes of blood or urine samples. As shown, the number of stations are balanced so that weight distribution about the circumference of rotor 45 is balanced. As shown, there are four hematocrit stations 51 spaced 90° apart and four carriage stations 52 spaced 90° apart. Naturally, the arrangement is a matter of choice as long as there is balance on the weight distribution at the various stations. This is important for centrifugation purposes.

Rotor 45 is constructed in an inexpensive manner of low cost materials to facilitate production of a centrifuge of the lowest possible ultimate cost. For example, rotor 45 can be formed of extruded aluminum with appropriate apertures and surfaces provided thereon to accommodate the equipment at the carriage stations and the hematocrit stations respectively. Alternatively, the one-piece rotor can be formed in other desirable inexpensive manners such as by forming or punching out surfaces and apertures in inexpensive metals or plastics.

Figure 2:
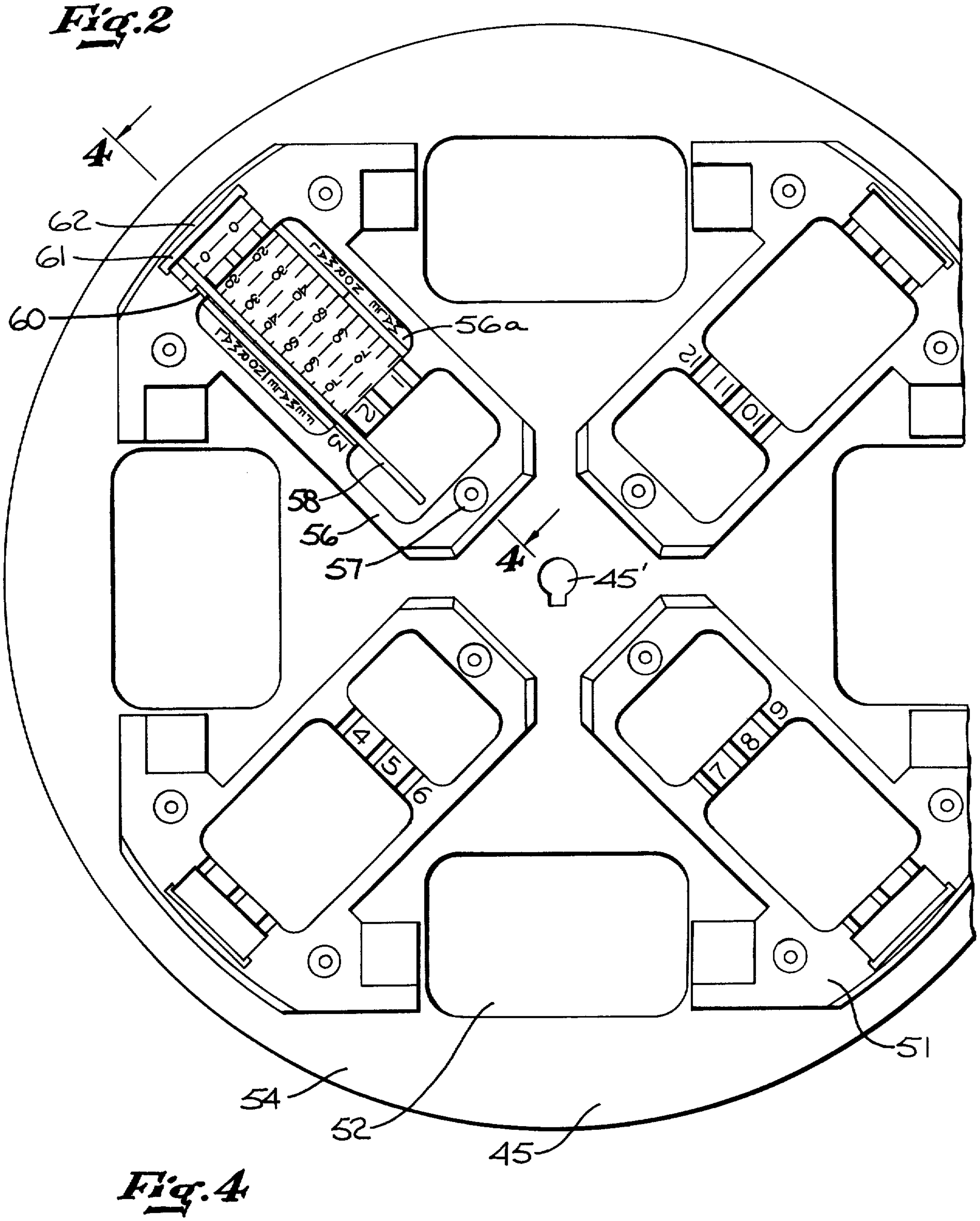
FIG. 2 is a fragmentary top plan view of the rotor head with the trunnion assemblies removed.
Figure 5:
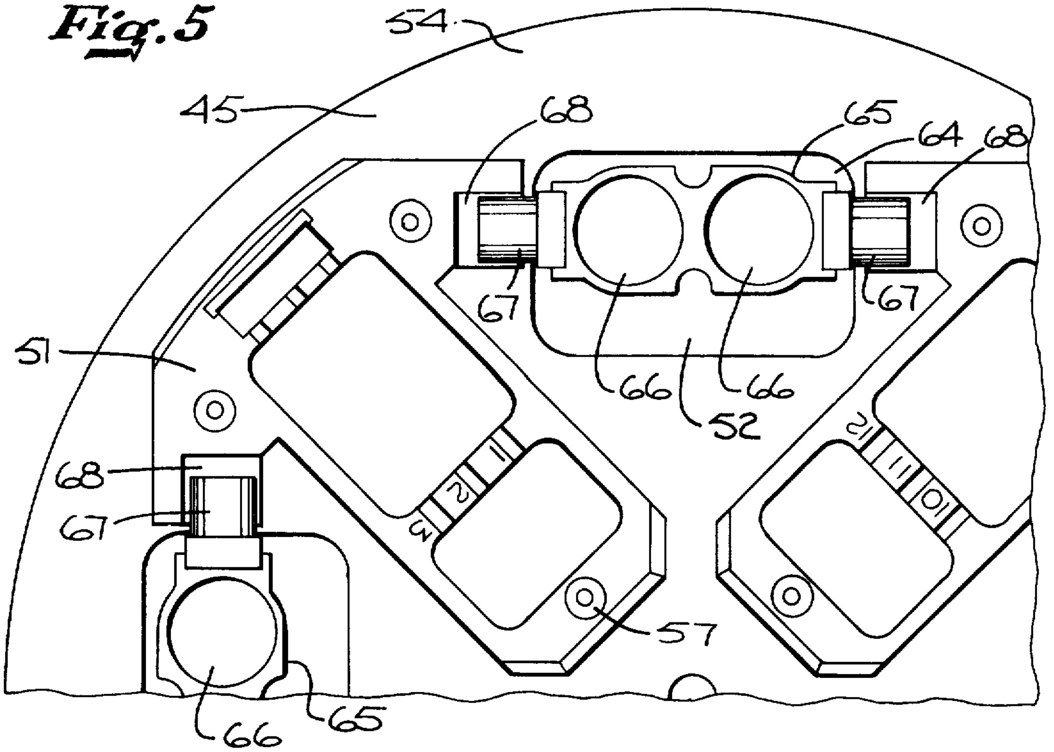
FIG. 5 is a fragmentary top plan view of the rotor head in the stopped condition with trunnion assemblies in place.
Figure 3:
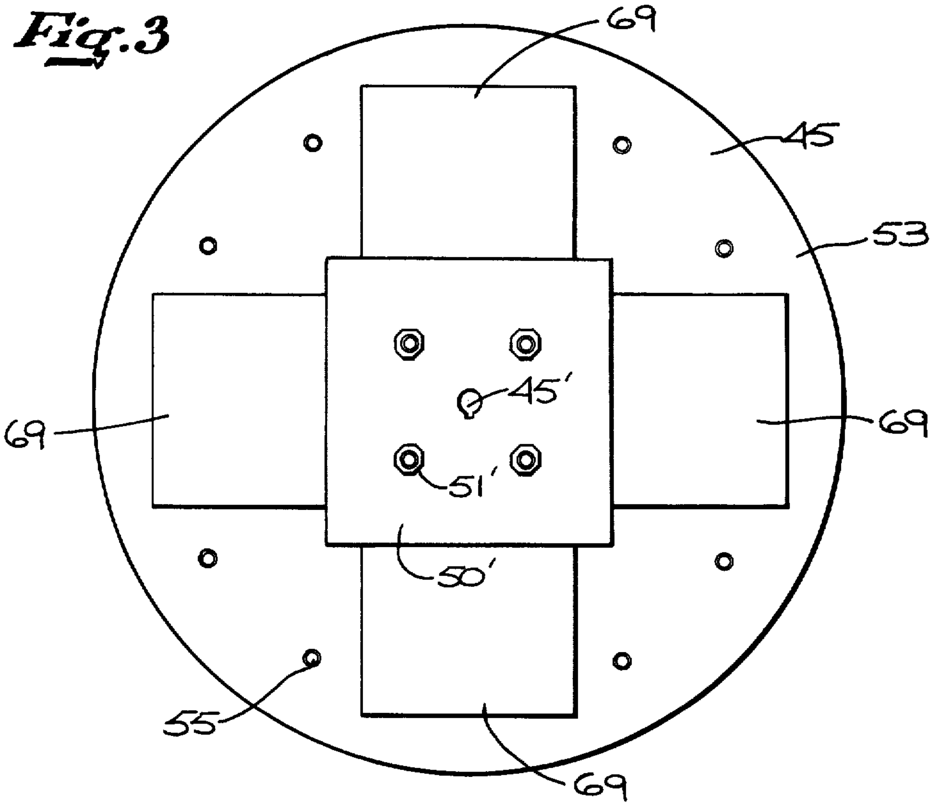
FIG. 3 is a bottom plan view of the rotor head portion of the centrifuge with the trunnion assemblies removed.

The lower surface 53 of rotor 45 is depicted in FIG. 3 and the upper surface 54 depicted in FIGS. 2 and 5. As seen in FIG. 3, the lower surface contains a plurality of fastener apertures 55 for receiving fastener members to hold the hematocrit plates 56 in position. There are three apertures 55 corresponding to the apertures 57 on each plate. A suitable fastener passes therethrough to affix the plate in position at each hematocrit station 51.

The fastener 63 which is closest to the center of keyway 45' in rotor 45 is longer than the remaining two fasteners of each set so as to pass through an additional bottom plate 50' and receive a nut 51' thereon to hold the plate to the rotor. Also captured by fastener 63, nut 51' and plate 50' is one cruciform flexible sheet 69 which covers the opening at each carriage station 52 when no trunnion assembly is located at that point and to be displaced by a trunnion assembly when one is present as shown in FIGS. 1, 6 and 7.

Figure 4:
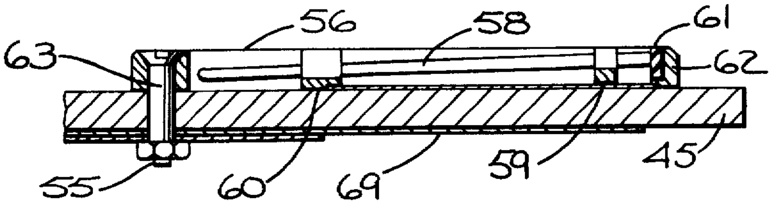
FIG. 4 is a fragmentary sectional side elevation view of a portion of the rotor head taken along the plane of lines 4—4 of FIG. 2.

As seen in FIGS. 2, 4 and 5 each hematocrit plate 51 is substantially rectangular in configuration with arms extending laterally from one end so as to appear generally T-shaped and includes three holding locations or slots 57 for a hematocrit tube 58. Each tube is held in position by the walls of a slot and rest on a pair of shoulders 59 and 60 which are axially aligned with the tube. Shoulder 59 is higher than shoulder 60 to facilitate retention of the hematocrit tube in position during centrifugration. A resilient stop 61 is employed at one end of plate 56 resting against shoulder 62 to index hematocrit tube 58 radially and to resiliently support it during the centrifugation operation. As shown, appropriate indicia 56' is applied at the upper surface of plate 56 to identify each hematocrit tube by number being used during the particular test. The plate 56 locates and retains a flat plate 56*a* used as a scale for direct reading of the results after centrifugation is complete. As shown, both female and male scales are employed for each plate 56*a*. In this manner, direct reading of the results of the test can be obtained without having to remove the hematocrit tubes from the centrifuge. Naturally, the amount of tubes 58 to be mounted on each individual plate 56 is a matter of choice depending upon the number of tests to be conducted at once. In the depicted embodiment, there are twelve locations for hematocrit determination during a particular cycle of the centrifuge.

When it is desired to test whole tubes of liquid such as blood or urine, the carriage stations 52 are employed. Details of these stations are present in FIGS. 5, 6, 7 and 8. Each carriage station 52 includes an opening 64 in the rotor 45 which is wide enough to receive a carriage or tunnion assembly 65. A pair of wells 66 extends vertically through assembly 65 with each well adapted to receive a tube of fluid to be tested. Extending laterally from the assembly 65 is a pair of aligned supports 67 which are cylindrical in configuration and are adapted to be seated on the rotor 45 next to an appropriate shoulder 68 so that the carriage 65 can swing freely as trunnions 65 are rotated during the centrifugation operation. The shoulders 68 are tapered downwardly and inwardly to facilitate positioning of trunnions 67 on rotor 45 and to retain the trunnions in position during operation of the centrifuge. Naturally, the number of wells 66 in a particular assembly is once again a matter of choice and in the embodiment depicted, there are four assemblies 65 and accordingly eight wells 66 so that eight tubes can be tested simultaneously during a cycle of the centrifuge.

Figure 6:
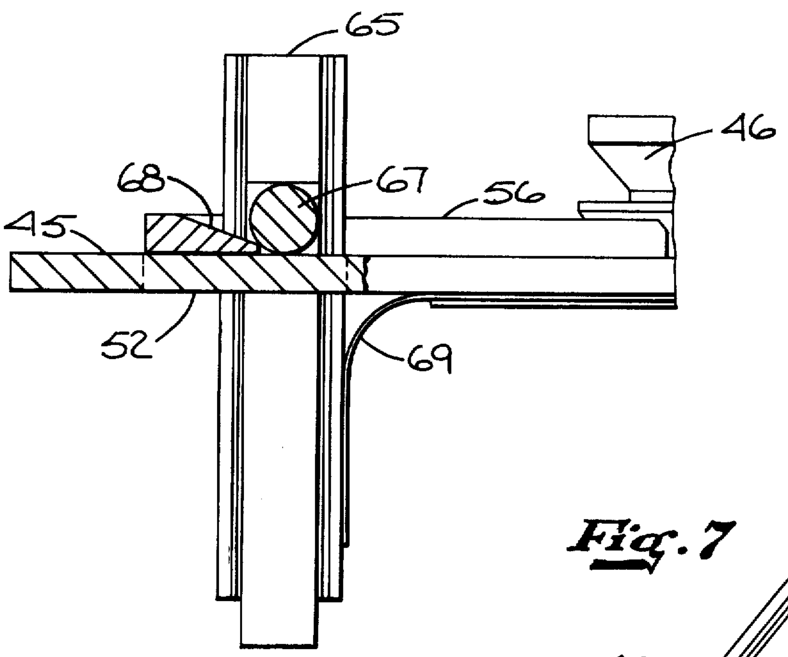
FIG. 6 is a fragmentary sectional elevation view of the rotor head with trunnion assemblies in place in the stopped condition.
Figure 7:
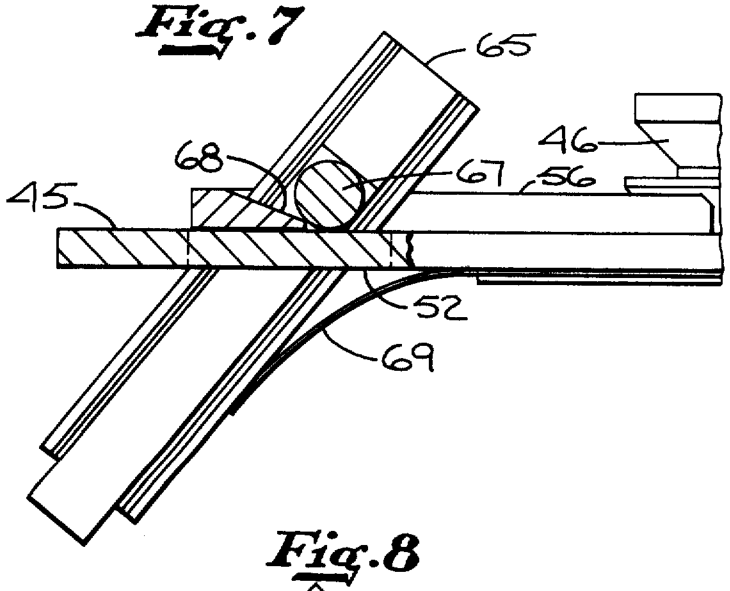
FIG. 7 is a fragmentary sectional side elevation view of the rotor head showing the same trunnion assemblies in position during centrifugation.

FIG. 6 depicts the position of each assembly 65 when the centrifuge is in the stopped position and under gravity. The assembly 65 is substantially in a vertical position. During the centrifuging operation, centrifugal forces rotate the assemblies 65 about support 67 into the position as shown in FIG. 7 during which time the contents of the tubes held in wells 66 are being subjected to centrifugal forces. Flexible member 69 has four flaps which correspond to the four carriage stations and are aligned therewith. The free end of each flap normally extends by centrifugal force during operation to cover the opening 64 in the rotor at each carriage station. This reduces the rotor windage power losses when the rotor is being run at its highest speed for hematocrit testing and trunnion assemblies 65 are not present. When the trunnion assemblies 65 are present, the flexible flaps of member 69 are displaced from a position below openings 64 in spring-like fashion and bear against the trunnion assembly 65 in deformed condition. In that position, the test being conducted is one which employs the trunnion assemblies for blood or urine tests at lower speeds and it is not necessary to close openings 64 in rotor 45 with flaps of member 69 to reduce windage losses. Member 69 is constructed of a conventional flexible material such as a rubber or a nylon fabric. When trunnion assemblies 65 are removed and the centrifuge is operated, the openings 64 are closed by resilient flaps of member 69 thereby preventing air circulation through rotor 45 and thereby reducing the power required to spin the rotor to hematocrit speed. Hematocrit speed is quite a bit greater than the speed for use with the trunnion assembly 65 being approximately 10,000 rpm versus 4,000 rpm. Thus, flaps of member 69 act as centrifugally positioned valves both to significantly reduce the power required for operation and to facilitate proper air flow through the centrifuge. The carriages 65 return close to the relaxed vertical position when the test is complete and the rotor is stopped.

Figure 8:
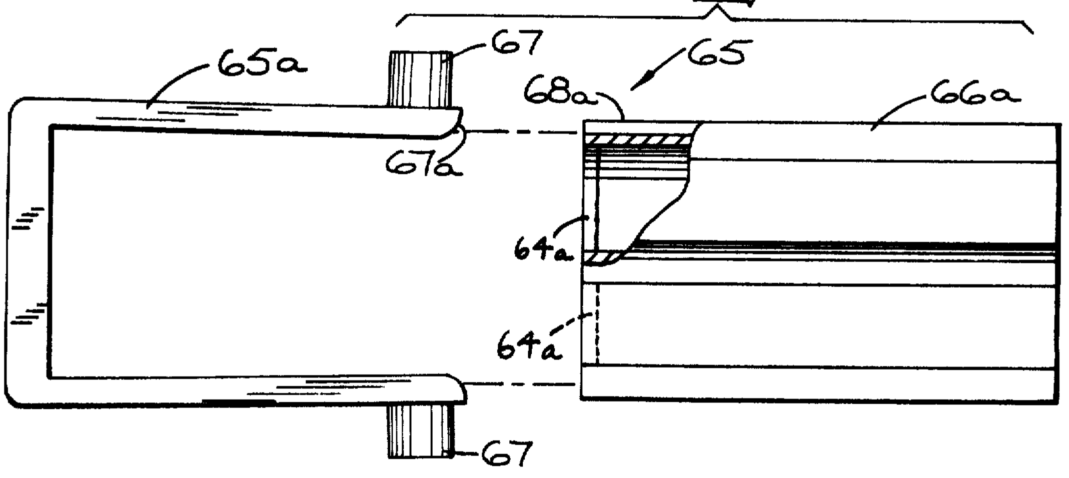
FIG. 8 is a top plan view of the trunnion assembly of the centrifuge in disassembled form.

Trunnion assembly 65 is manufactured of a low cost material in a low cost manner. As shown in FIG. 8, it is formed of a U-shaped support **65*a* and a rectangularly shaped receptacle 66*a*. An example of material which can be used for support 65*a* and receptacle 66*a* of assembly 65 is an aluminum extrusion cut to length. Naturally, it is foreseeable how the same components could be molded from metal or plastic material in an inexpensive manner. The U-shaped support 65 contains the cylindrical supports 67 integrally formed thereon either by molding, forging or machining the appropriate surfaces on support 65*a*. The legs of support 65*a* taper inwardly toward the open end so that the opening is narrower than the width of the body of receptacle 66*a*. Accordingly, when the components are assembled receptacle 66*a* engages with the inner surfaces of the arms of support 65*a* and forces them apart permitting the full insertion of support 66*a* until the supports 67 are properly located long the length of receptacle 66*a*. The tendency of the resilient arms of support 65*a* to return to their initial configuration causes a gripping of the exterior sides of receptacle 66*a*. This frictional interengagement retains the support 65*a* and receptacle 66*a* assembled condition. To facilitate the assembling operation, the inner edge 67*a* of each leg of support 65*a* is tapered or beveled to facilitate introduction into a slot 68*a* in each respective side of receptacle 66*a***.

A resilient cushion of material such as rubber is positioned in the bottom of each well of each receptacly **66*a*. The cushion 64*a* forms a resilient base for seating of each tube as it is inserted in receptacle 66*a* during the testing procedure. The cushion 64*a* is held in position by frictional engagement with the side walls of the well and with engagement with the base portion of support 65*a***.

Cover 25 is fixed by fastener 70 on one side of upper portion 23 of stator 21 and upwardly extending short leg 71 holds a pivot pin 72 to which is mounted the horizontal larger cover portion 73. The larger cover portion 73 extends across the upper opening of chamber 26 and terminates in a downwardly extending latch leg 74. A lip 75 extends inwardly from the lower end of latch leg 74 to provide the ultimate locking surface for the latch. The latch leg 74 is L-shaped in configuration and has a latch arm 75' extending upwardly over the surface 73 of cover 25 and is pivotally mounted thereto by means of pivot pin 76. A helical spring 77 biases latch handle 75' upwardly and accordingly normally biases lip 75 into engagement with locking prong 78 mounted on the stator.

The larger portion 73 to cover 25 which covers opening 26 includes a circumferential ring 80 extending downwardly into engagement with the upper peripheral surface of stator upper half 23. At the point of engagement with ring 80 the stator is provided with a sealing member 81 of appropriate and well known sealing material. Ring 80 extend about the entire circumference of the centrifuge so that sealing engagement is achieved throughout the entire peripheral surface to opening 26 thereby permitting complete sealing of chamber 26 when the latch is closed on cover 25.

A spring loaded control rod 82 extends from the control box 29 into interference with the cover 25. A switch 83 operated by the spring loaded rod 82 is connected so motor 30 cannot be energized unless the cover 25 is closed. When the cover is closed, rod 82 is pushed downward against the bias of the spring and activates the switch 83 thereby permitting the motor to be started. When the cover is open, the rod 82 is biased upward by the spring which deactivates the switch and prevents operation of the motor and simultaneously actuates a motor dynamic braking circuit.

In operation, when the centrifuge 20 is in the off position, latch 75' is depressed permitting cover 25 to be opened. Appropriate samples of hematocrit tubes or tubes containing other blood specimens or urine can be loaded unto the receiving surfaces of the rotor 45 in the manner described above. For hematocrit tests, the hematocrit stations 51 are loaded. For urine and blood tests the carriage stations 52 are loaded with tubes. For hematocrit tests the trunnion assemblies 65 are removed and the rotor cover 46' secured with nut 46. The cover 25 is then closed and spring 77 causes latch lip 75 to interengage with prong 78 locking cover 25 in position. Sealing means 81 provides a peripheral seal about the upper surface of chamber 26 to get the desired sealing effect.

The control means 29 is then operated with plug 31 inserted in an appropriate electrical outlet so that power is supplied to motor 30 and in turn through shaft 44 rotor 45 is rotated. The appropriate speed for the rotor is determined by the control means 29 which is designed in conventional fashion to provide three speeds for the motor 30 and accordingly three speeds for rotor 45. The number of speeds is a matter of choice and it has been found to work effectively with the depicted embodiment if three speeds are chosen. One speed is for tubes of blood held in the carriages 65, a second speed is utilized when tubes of urine are held in carriages 65 and a third speed is utilized when hematocrit tubes are mounted in position at hematocrit stations 51. The rotation continues for the desired period of time whereupon the controls automatically turn the centrifuge off. A braking means is included for the use of the operator. Latch arm 75' can be depressed to compress spring 77 and free lip 75 from bar 78 at which time cover 25 can be opened. Interconnected rod 82 and switch 83 prevents the motor from operating while the cover is open.

With the cover open, direct readings of hematocrit can be taken due to the appropriate indicia 56*a* if that is the test being conducted. If whole tubes of blood or urine are being centrifuged, the tubes can then be removed from the carriages and handled in appropriate well known fashion subsequent to the centrifuging operation.

Noise level is held at a low level for the centrifuge due to the various resilient means as described above about the surfaces of the centrifuge where components interengage. Among the resilient structures are circular tubing 47, resilient bases 41, the resilient gasket material 81 and the resilient type feet 39 and 40.

Additionally, during use appropriate openings such as openings 49 and 50 and in the bottom of the centrifuge provide access for air currents to ventilate and cool the interior of the centrifuge in a desirable fashion.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A centrifuge comprising: a stator portion forming a chamber therein and adapted to be positioned on a supporting surface;

a rotor portion rotatably mounted in the chamber of the stator;

variable drive means on the stator and connected to the rotor to rotate the rotor at desired speeds;

sample holding means on the head adapted to hold a number of different types of sample holders;

a cover on the stator adapted to be shifted between the open and closed positions;

control means connected to the drive means to vary the speed of the rotor to correspond with the speed required for centrifuging the samples being held in the sample holding means and for starting and stopping the centrifuge;

the rotor portion including a disc-shaped head of substantially one-piece with appropriate openings and surfaces for receiving the variety of sample holding means thereon;

a cruciform flexible sheet forming four extending flaps being mounted on the underside of the head and being shiftable between one position when there is no sample holder being employed and a second position when there is a sample holder being employed to reduce windage power losses and to facilitate proper air flow in the centrifuge during operation thereof;

the flaps being located opposite openings in the rotor disc by centrifugal force to close the openings in the disc and prevent air flow through the openings in the disc when in the one position and to expose the openings when in the second position; and the flaps comprising a set of centrifugally operated valves which are held open by sample holders used at lower rotor speeds and allowed to close when the sample holders are removed.

2. A centrifuge comprising:

a stator portion forming a chamber therein and adapted to be positioned on a supporting surface;

a rotor portion rotatably mounted in the chamber of the stator;

variable drive means on the stator and connected to the rotor to rotate the rotor at desired speeds;

sample holding means on the head adapted to hold a number of different types of sample holders;

a cover on the stator adapted to be shifted between the open and closed positions;

control means connected to the drive means to vary the speed of the rotor to correspond with the speed required for centrifuging the samples being held in the sample holding means and for starting and stopping the centrifuge;

the rotor portion including a disc-shaped head of substantially one-piece with appropriate openings and surfaces for receiving the variety of sample holding means thereon;

a sheet including extending flexible flaps being mounted on the underside of the head and being shiftable between one position when there is no sample holder being employed and a second position when there is a sample holder being employed to reduce windage power losses and to facilitate power air flow in the centrifuge during operation thereof;

the flaps being located opposite openings in the rotor disc by centrifugal force to close the openings in the disc and prevent air flow through the openings in the disc when in the one position and to expose the openings when in the second position; and the flaps comprising a set of centrifugally operated valves which are held open by sample holders used at lower rotor speeds and allowed to close when the sample holders are removed.

3. The invention in accordance with claim 2 wherein the stator is mounted in a fixed position in the supporting structure, insulating means is provided on the centrifuge along with vibration absorbing means to minimize the noise caused by the centrifuge during operation, and the sample housing means includes a plurality of stations adapted for receiving samples of blood and urine.

4. A centrifuge comprising:

a stator portion forming a chamber therein and adapted to be positioned on a supporting surface;

a rotor portion rotatably mounted in the chamber of the stator;

variable drive means on the stator and connected to the rotor to rotate the rotor at desired speeds;

sample holding means on the head adapted to hold a number of different types of sample holders;

a cover on the stator adapted to be shifted between the open and closed positions;

control means connected to the drive means to vary the speed of the rotor to correspond with the speed required for centrifuging the samples being held in the sample holding means and for starting and stopping the centrifuge;

the blood and urine stations each including a removable trunnion assembly with a predetermined number of wells therein;

the trunnion assembly having a pair of opposed laterally extending trunnions intermediate the ends thereof;

the rotor containing a pair of spaced shoulders at each station to receive the assembly therebetween and the trunnions resting in rotatable position thereon to permit the trunnion assembly to rotate and tip the assembled holding wells during said centrifugation thereof;

each trunnion assembly including a U-shaped resilient support with the opposing arms thereof tapering toward one another toward the open end;

a central body receptacle containing the wells and being slidably insertable between the legs of the U-shaped support whereby the legs of the support are forced apart during interconnection with the body and frictionally engage with the body portion in tending to return to the relaxed position thereby holding the body portion and receptacle together; and the body portion containing a pair of opposing slots along opposing longitudinal edges thereof with each slot adapted to receive a leg of the support slidably therein.

5. The invention in accordance with claim 4 wherein each shoulder has a tapered upper surface tapering downwardly and inwardly toward the center of the rotor to facilitate mounting of the trunnions thereon and to prevent accidental removal therefrom, four stations being equally angularly spaced about the circumference of the rotor and each assembly contains two wells in side-by-side relationship.

6. The invention in accordance with claim 4 wherein a resilient cushion is positioned at the bottom of each well of each trunnion assembly.

7. The invention in accordance with claim 2 wherein ventilation apparatus is placed about the exterior surface of the centrifuge in position to provide air currents to the interior thereof during operation for ventilation and cooling purposes.

8. The invention in accordance with claim 2 wherein the cover contains a latch to retain it in position when closed and means is provided to tightly seal the cover to the stator when the latch is closed, switch means being provided to prevent the motor from operating when the cover is open and responsive to closing of the cover to permit the motor to operate and centrifugation to be carried out, and the control means being electrical.

* * * * *